(12) United States Patent
Barsness et al.

(10) Patent No.: US 9,189,524 B2
(45) Date of Patent: *Nov. 17, 2015

(54) OBTAINING PARTIAL RESULTS FROM A DATABASE QUERY

(71) Applicant: International Business Machines Corporation, Armonk, NY (US)

(72) Inventors: Eric L. Barsness, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/277,910

(22) Filed: May 15, 2014

(65) Prior Publication Data

US 2014/0250103 A1    Sep. 4, 2014

Related U.S. Application Data

(63) Continuation of application No. 13/435,853, filed on Mar. 30, 2012.

(51) Int. Cl.
  *G06F 17/30* (2006.01)
(52) U.S. Cl.
  CPC .... *G06F 17/30474* (2013.01); *G06F 17/30424* (2013.01); *G06F 17/30463* (2013.01); *G06F 17/30536* (2013.01)

(58) Field of Classification Search
  CPC .................................................. G06F 17/30474
  See application file for complete search history.

(56) References Cited

U.S. PATENT DOCUMENTS

| | | | |
|---|---|---|---|
| 7,693,816 B2 * | 4/2010 | Nemoto et al. | 707/781 |
| 8,122,010 B2 * | 2/2012 | Barsness et al. | 707/718 |
| 8,577,907 B1 | 11/2013 | Singhal et al. | |
| 2005/0060285 A1 | 3/2005 | Barsness et al. | |
| 2005/0177557 A1 * | 8/2005 | Ziauddin et al. | 707/3 |
| 2008/0046420 A1 * | 2/2008 | Barsness et al. | 707/4 |
| 2008/0288446 A1 | 11/2008 | Hu et al. | |
| 2008/0288473 A1 * | 11/2008 | Hu et al. | 707/4 |
| 2009/0106321 A1 | 4/2009 | Das et al. | |
| 2013/0212085 A1 * | 8/2013 | Nica et al. | 707/718 |

\* cited by examiner

*Primary Examiner* — Sherief Badawi
*Assistant Examiner* — Sabana S Rahman
(74) *Attorney, Agent, or Firm* — Martin & Associates, LLC; Derek P. Martin (57) ABSTRACT

A database query governor determines when a query cannot be executed within a defined time threshold, but still executes the query or some variant of the query so partial results for the query may be returned to the user after executing for less than the defined time threshold, instead of an error message indicating the query was not executed at all. The partial results provide information to the user that may be sufficient for some applications, or may indicate to the user how the query could be modified to run in less time.

2 Claims, 7 Drawing Sheets

Select employee_id, employee_name, taxrate(salary) from allEmployeeTable where employeeName like = ?

Select employee_id, employee_name, taxrate(salary) from allEmployeeTable where employeeName like = ? or employee_id < ?

Select employee_id, employee_name, taxrate(salary) from allEmployeeTable where employeeName like = ? or employee_id < ?

Select employee_id, employee_name, taxrate(salary) from
allEmployeeTable where employeeName like = ?

FIG. 13

Partial Results

All fields employee_id, employee_name,
where employeeName like = ?
for first time period

OBTAINING PARTIAL RESULTS FROM A DATABASE QUERY

BACKGROUND

1. Technical Field

This disclosure generally relates to database systems, and more specifically relates to executing queries in database systems.

2. Background Art

Databases are computerized information storage and retrieval systems. A database system is structured to accept commands to store, retrieve and delete data using, for example, high-level query languages such as the Structured Query Language (SQL). The term "query" denotes a command for retrieving data from a stored database. The query language requires the return of a particular result set in response to a particular query.

Optimization and execution of a database query can be a resource-intensive and time-consuming process. Further, the larger the database, the longer the time needed to execute the query. In order to prevent an excessive drain on resources, many databases are configured with query governors. A query governor prevents the execution of large and resource-intensive queries by referencing a defined time threshold. If the cost of executing a query exceeds the time threshold, known query governors prevent execution of the query. A simple example will illustrate. Let's assume a query governor has a defined time threshold of two seconds. If the best access plan generated by a query optimizer takes over two seconds for the query to execute, the query governor will prevent execution of the query, and will typically return a message to the user that attempted to run the query indicating the query would take too long to execute. The user can then attempt to modify the query and execute the modified query in the hopes the modified query will run in under two seconds. However, this is a manual trial-and-error approach that is inefficient and error-prone.

BRIEF SUMMARY

A database query governor determines when a query cannot be executed within a defined time threshold, but still executes the query or some variant of the query so partial results for the query may be returned to the user after executing for less than the defined time threshold, instead of an error message indicating the query was not executed at all. The partial results provide information to the user that may be sufficient for some applications, or may indicate to the user how the query could be modified to run in less time.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a database query governor that determines when a query cannot be executed within a defined time threshold, but still executes the query or some variant of the query so partial results for the query may be returned to the user after executing for less than the defined time threshold, instead of an error message indicating the query was not executed at all. The partial results provide information to the user that may be sufficient for some applications, or may indicate to the user how the query could be modified to run in less time.

Figure 1:
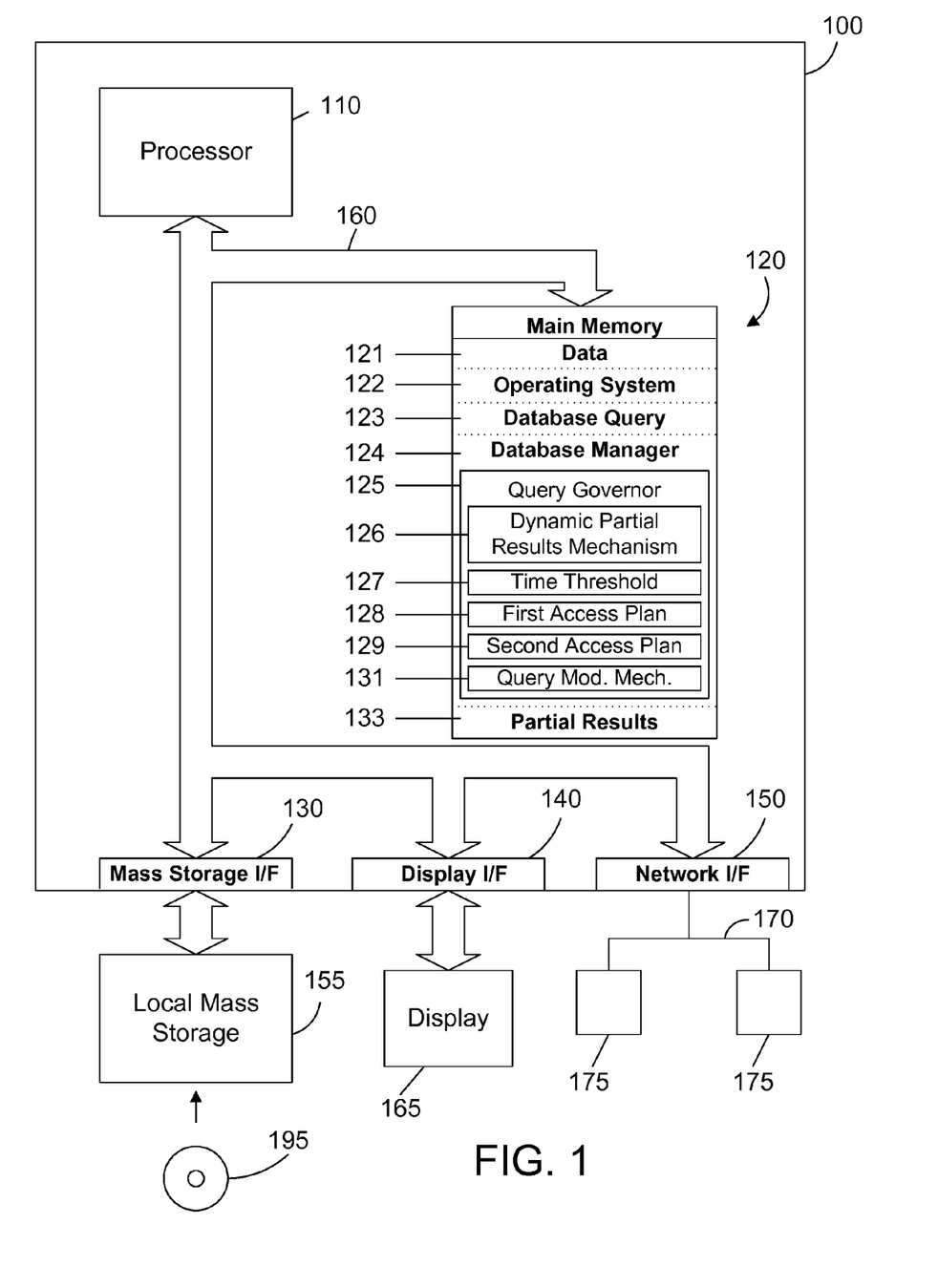
FIG. 1 is a block diagram of an apparatus that includes a query governor that returns partial results when a query cannot be run within a specified time threshold.

Referring to FIG. 1, a computer system 100 is one suitable implementation of a computer system that includes a query governor as disclosed and claimed herein. Computer system 100 is an IBM eServer System x computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, a database query 123, a database manager 124, and partial results 133. Data 121 represents any data that serves as input to or output from any program in computer system 100. Operating system 122 is a multitasking operating system. Database query 123 is any suitable database query, such as an SQL query. Database manager 124 processes database queries, such as database query 123. Database manager 124 includes a query governor 125 that determines when the estimated time to execute a query exceeds a time threshold 127. The dynamic partial results mechanism 126 may execute the query and/or some variant of the query within the time specified by the time threshold 127, and return partial results 133. The dynamic partial results mechanism 126 may use a first access plan 128 and/or a second access plan 129 for the database query 123 or some variant of the database query. For example, the first access plan 128 could be an access plan corresponding to the original query, while the second access plan 129 could be an access plan corresponding to a variant of the query, as discussed in more detail below. In addition, the dynamic partial results mechanism may also include a query modification mechanism 131 that dynamically modifies the query. In response to the database manager 124 executing the modified query, partial results 133 may be returned. The query governor 125 is an improvement over known query governors that simply deny executing a query when the estimated time to execute the query exceeds the specified time threshold 127. Instead, query governor 125 executes the query or some variant within the specified time threshold 127, then returns the partial results 133. When partial results 133 are returned to a user in response to executing the database query 123, the partial results 133 are preferably accompanied by a message indicating the results of the query are partial and not complete. The user may then examine the partial results and determine whether the results returned were adequate, or whether the user needs to formulate a different query. Note the term "partial results" as used herein means that full query results are not returned, and instead partial results are returned that are less than all results that would have been returned for the query had the query been allowed to fully execute.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, database query 123, database engine 124, and partial results 133 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the database manager 124 and query governor 125.

Although computer system 100 is shown to contain only a single processor and a single system bus, those skilled in the art will appreciate that a query governor may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Figure 2:
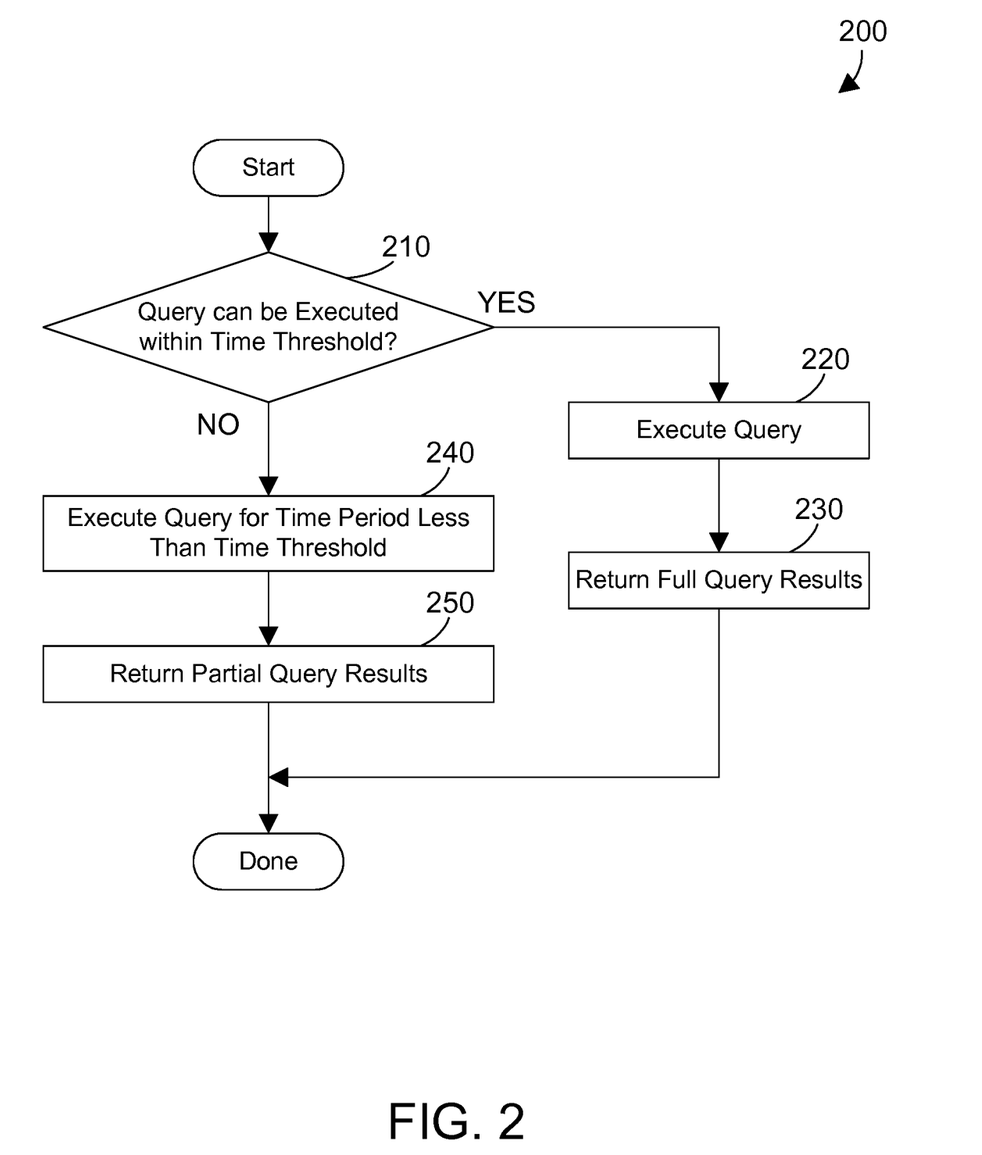
FIG. 2 is a flow diagram of a method for the query governor in FIG. 1 to process queries.

Referring to FIG. 2, a method 200 is preferably performed by the query governor 125 in FIG. 1. When the query can be executed within the time threshold (step 210=YES), the query is executed (step 220) and full query results are returned (step 230). When the query cannot be executed within the time threshold (step 210=NO), the query is executed for a time period less than the time threshold (step 240), and partial query results are returned (step 250). Method 200 is then done.

Figure 3:
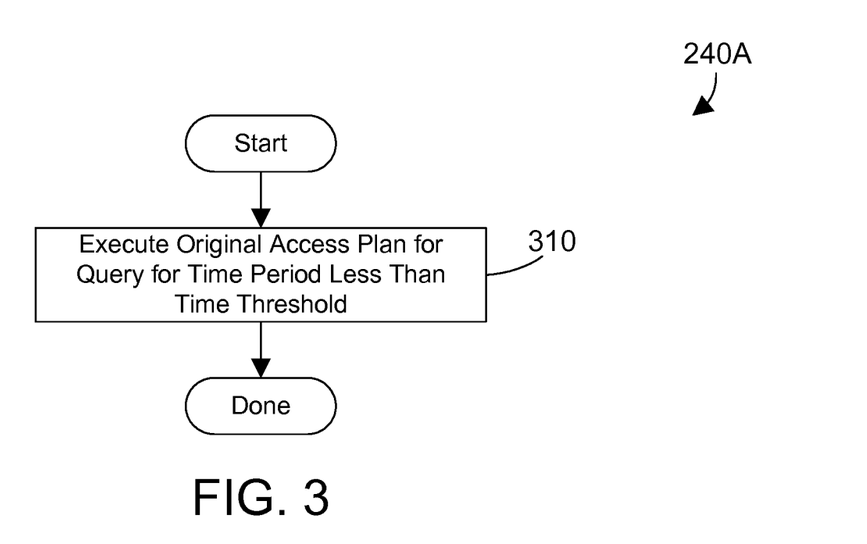
FIG. 3 is a flow diagram of a method showing a first implementation for step 240 in FIG. 2.
Figure 4:
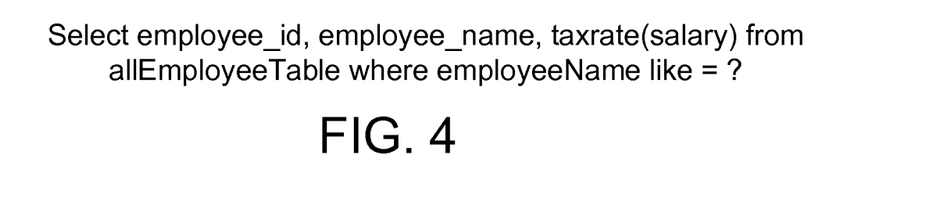
FIG. 4 is a sample query for illustrating the method shown in FIG. 3.
Figure 5:
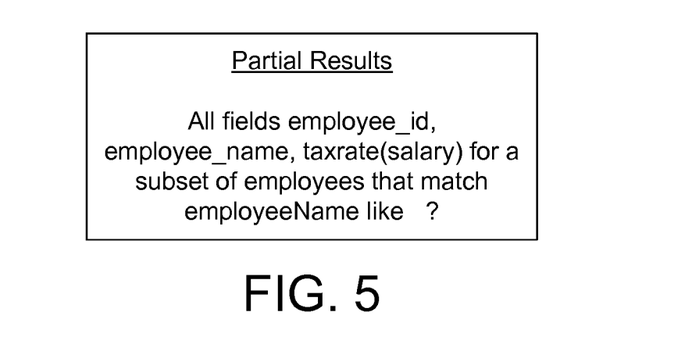
FIG. 5 is a block diagram showing partial results returned by the query governor using the method in FIG. 3 for the query in FIG. 4.

There are many different ways for a query governor to execute a query for a time period less than the time threshold in step 240 in FIG. 2. Four such ways are shown in FIGS. 3, 6, 9 and 12. Referring to FIG. 3, method 240A represents a first suitable implementation of step 240 in FIG. 2. The original access plan is executed for a time period less than the time threshold (step 310). One suitable example is shown in FIGS. 4-5. A sample query is shown in FIG. 4. The sample query in FIG. 4 will be executed in step 310 in FIG. 3 for a period of time less than the time threshold. The partial results are all fields in the query, but for some subset of employees that match employeeName like=?, as shown in FIG. 5. In essence, the normal query is executed until it runs out of time, and whatever results have been gathered to that point in time are returned.

Figure 6:
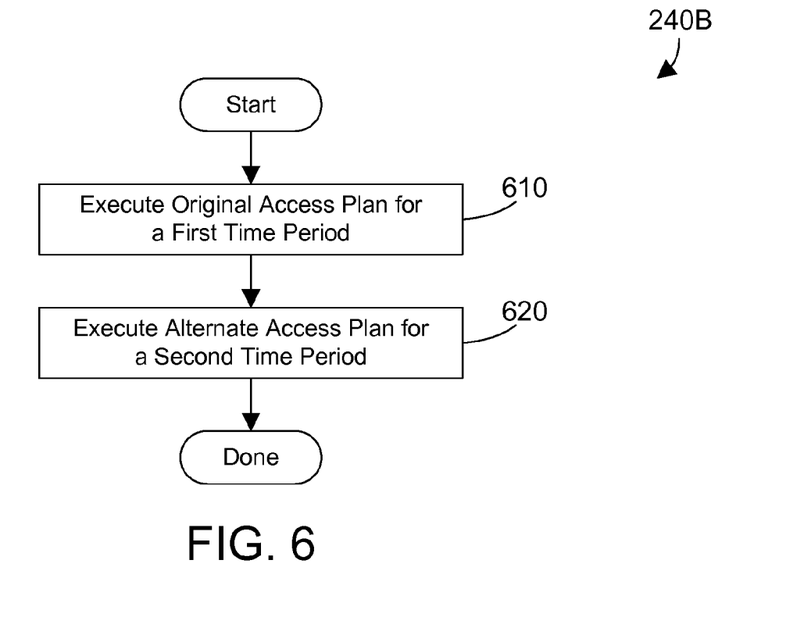
FIG. 6 is a flow diagram of a method showing a second implementation for step 240 in FIG. 2.
Figure 7:
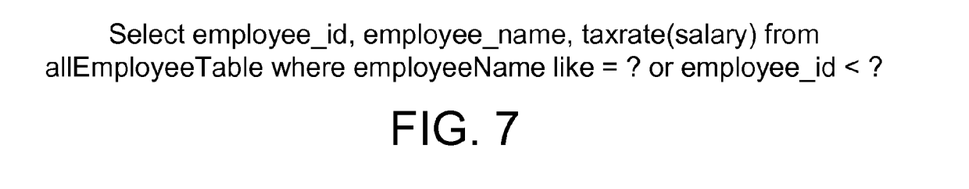
FIG. 7 is a sample query for illustrating the method shown in FIG. 6.
Figure 8:
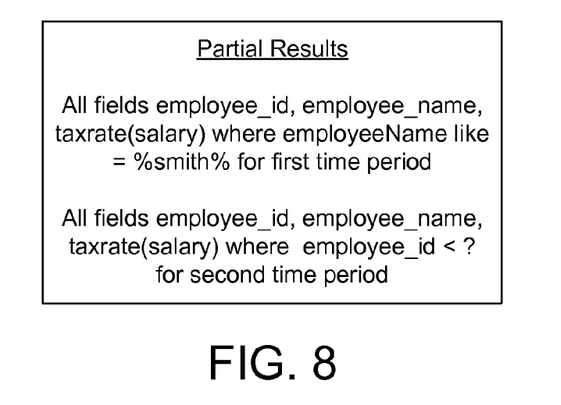
FIG. 8 is a block diagram showing partial results returned by the query governor using the method in FIG. 6 for the query in FIG. 7.

A second way for a query governor to execute a query for a time period less than the threshold time in step 240 in FIG. 2 is shown by method 240B in FIG. 6. The original access plan for the query is executed for a first period of time (step 610). An alternate access plan is then executed for the second time period (step 620). Note the sum of the first and second time periods is less than the time threshold for the query governor. The original and alternate access plans in steps 610 and 620 correspond to the first access plan 128 and second access plan 129 shown in FIG. 1. The alternate access plan in step 620 is an access plan for a variant of the original query, as shown by the example in FIGS. 7-8. A sample query is shown in FIG. 7 to include an OR condition in the WHERE clause. In this example, we assume the query is run with employeeName like='% smith %', which means an index cannot be used on that field. After executing for a first period of time, the query governor determines the query cannot complete execution within the specified time threshold. The query results to that point are kept, but the query is altered to just look for matches to "employee_id<?" because this can be done quickly due to an index on the employee_id field. The two result sets are returned together as the partial results, as shown in FIG. 8.

Figure 9:
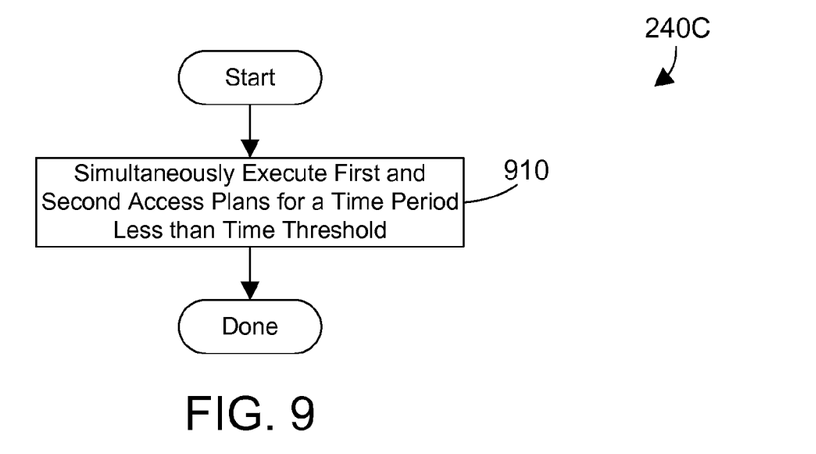
FIG. 9 is a flow diagram of a method showing a third implementation for step 240 in FIG. 2.
Figure 10:
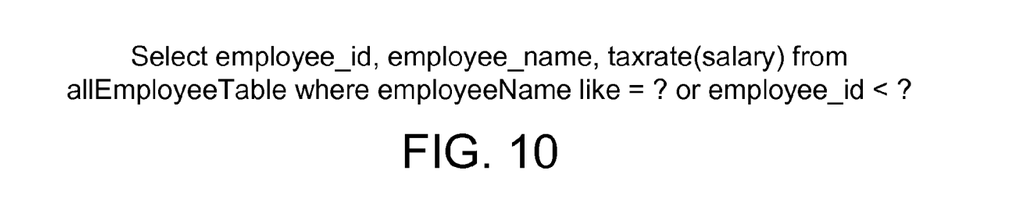
FIG. 10 is a sample query for illustrating the method shown in FIG. 9.
Figure 11:
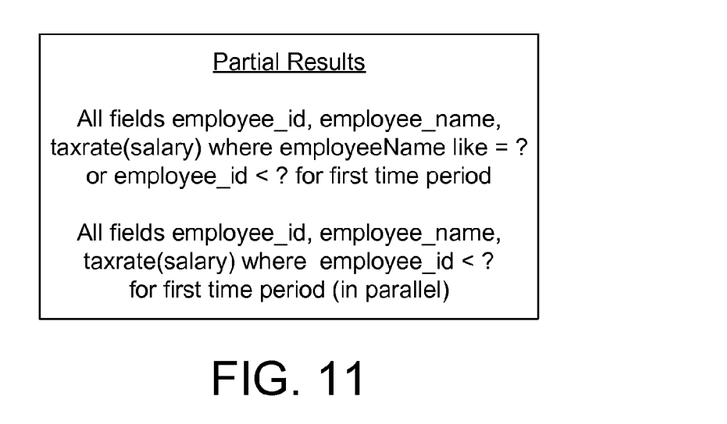
FIG. 11 is a block diagram showing partial results returned by the query governor using the method in FIG. 9 for the query in FIG. 10.

A third way for a query governor to execute a query for a time period less than the threshold time in step 240 in FIG. 2 is shown by method 240C in FIG. 9. First and second access plans are executed simultaneously for a time period less than the time threshold (step 910). The first and second access plans in step 240 correspond to the first and second access plans 128 and 129 in FIG. 1. An example is shown in FIGS. 10-11. In this example, the second access plan is an access plan for a variant of the query represented by the first access plan. A sample query is shown in FIG. 10 to include an OR condition in the WHERE clause. In this example, an access plan that includes both terms "employeeName like=? or employee_id<?" in the WHERE clause is executed simultaneously (i.e., in parallel) with an access plan that includes only the first term "employeeName like=?" in the WHERE clause. In the event the full query does not finish executing in the allowed time threshold, the partial query will have additional data to return. The two result sets from both access plans are returned together as the partial results, as shown in FIG. 11. Simultaneous execution of two access plans could be performed when getting results is a more important consideration than resource utilization.

Figure 12:
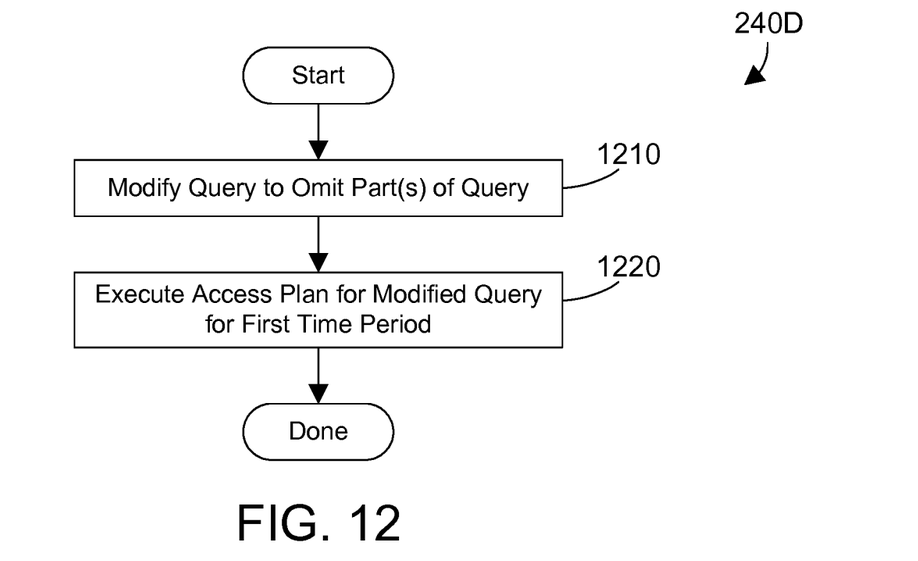
FIG. 12 is a flow diagram of a method showing a fourth implementation for step 240 in FIG. 2.
Figure 13:
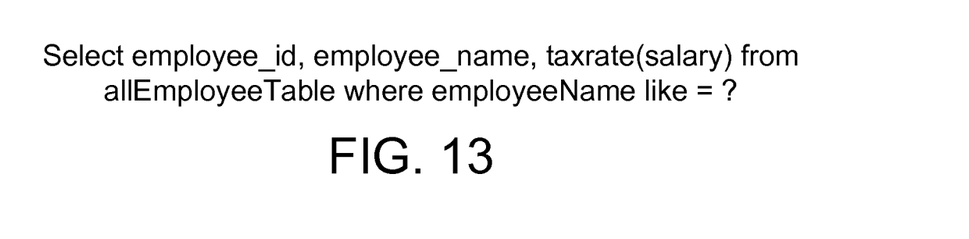
FIG. 13 is a sample query for illustrating the method shown in FIG. 12.
Figure 14:
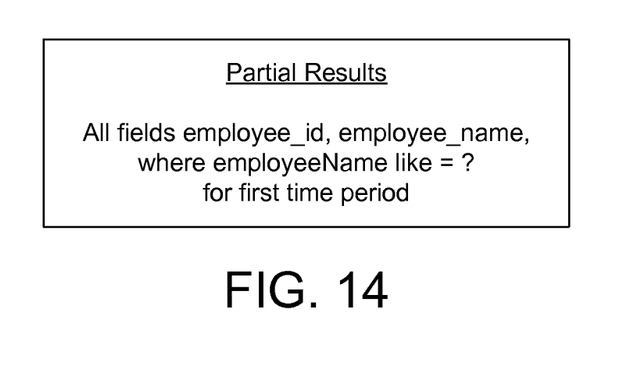
FIG. 14 is a block diagram showing partial results returned by the query governor using the method in FIG. 12 for the query in FIG. 13.

A fourth way for a query governor to execute a query for a time period less than the threshold time in step 240 in FIG. 2 is shown by method 240D in FIG. 12. The query is modified to omit one or more parts of the query (step 1210). An access plan for the modified query is then executed for a first time period that is less than the threshold time (step 1220). The modified access plan represents a query that is a variant of the original query. An example is shown in FIGS. 13-14. In this example, we assume the query governor determines that the taxrate(salary) portion of the query is too time consuming to run for each record returned in the result and still be within the specified time threshold. Instead, the query governor modifies the query in FIG. 13 to omit the term "taxrate(salary)", and an access plan is then executed for the modified query, which we assume will take less time than the time threshold to execute. The partial results are the results for the modified query, as shown in FIG. 14.

Figure 15:
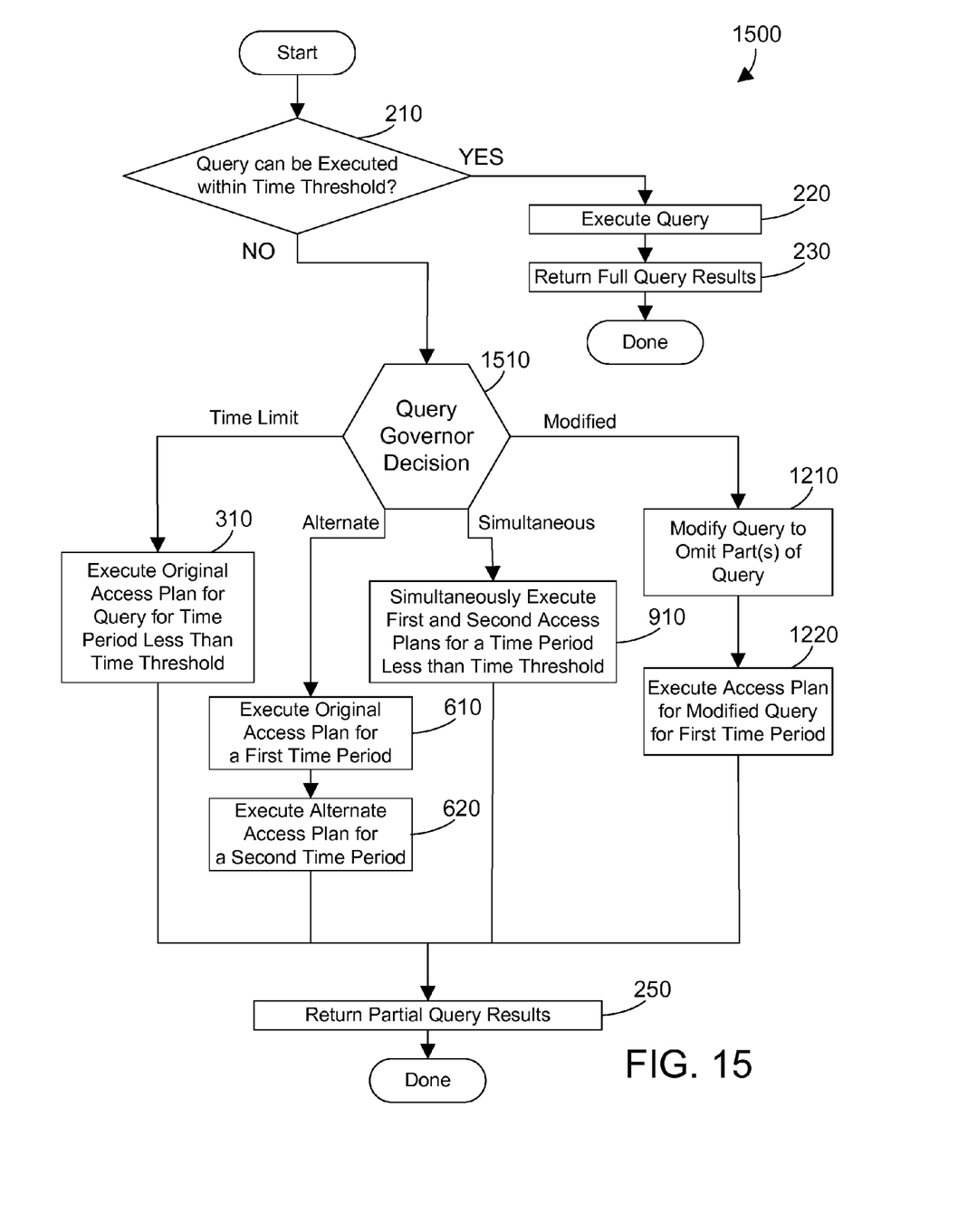
FIG. 15 is a flow diagram of a method for the query governor in FIG. 1 to process queries.

Referring to FIG. 15, a method 1500 represents the function of the query governor 125 in FIG. 1 when the query governor is allowed to choose between the four different examples shown in FIGS. 3, 6, 9 and 12. When the query can be executed within the time threshold (step 210=YES), the query is executed (step 220) and full query results are returned (step 230). Note steps 210, 220 and 230 are identical to the steps of the same numbers in FIG. 2. When the query cannot be executed within the time threshold (step 210=NO), the query governor decides which of the four methods to use to return partial results for the query (step 1510). When the query governor decides to limit the time of execution of the full query (step 1510=Time Limit), the original access plan for the query is executed for a time period less than the time threshold (step 310). When the query governor decides to execute alternate query plans (step 1510=Alternate), the original access plan is executed for a first time period (step 610), followed by executing an alternate access plan for a second time period (step 620), where the sum of the first and second time periods is less than the time threshold. When the query governor decides to execute simultaneous access plans (step 1510=Simultaneous), first and second access plans are simultaneously executed for a time period less than the time threshold (step 910). When the query governor decides to execute a modified query (step 1510=Modified), the query is modified to omit one or more parts of the query (step 1210), and an access plan for the modified query is executed for a first time period (step 1220) that is less than the time threshold. In each case, partial query result are returned in step 250. Note the query governor may make any of the four decisions in step 1510 based on any suitable criteria or heuristic. For example, when there is an OR term in the WHERE clause of a query, the "Simultaneous" decision could be made. The user may define preferences that govern which decision is made by the query governor in step 1510. In addition, the decision made in step 1510 may be affected by current database conditions, such as loading, response time, number of users connected, etc. The disclosure and claims herein expressly extend to any suitable way for the query governor to determine which decision to make in step 1510 in FIG. 15.

The disclosure and claims relate to a database query governor that determines when a query cannot be executed within a defined time threshold, but still executes the query or some variant of the query so partial results for the query may be returned to the user after executing for less than the defined time threshold, instead of an error message indicating the query was not executed at all. The partial results provide information to the user that may be sufficient for some applications, or may indicate to the user how the query could be modified to run in less time.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:
1. An apparatus comprising:
at least one processor;
a memory coupled to the at least one processor;
a plurality of queries to a database; and
a query governor that performs the steps of:
determining a first of the plurality of queries cannot be executed in less time than a specified threshold value;
in response to determining the first query cannot be executed in less time than the specified threshold value, performing the steps of:
executing an access plan for the first query for a period of time less than the specified threshold value;
halting execution of the access plan; and
returning the partial results for the first query;
determining a second of the plurality of queries cannot be executed in less time than the specified threshold value;
in response to determining the second query cannot be executed in less time than the specified threshold value, performing the steps of:
executing a first access plan for the second query for a first period of time;
executing a second access plan for the second query for a second period of time, wherein the first period of time added to the second period of time is less than the specified threshold value; and
returning query results from executing the first access plan and the second access plan as the partial results for the second query;
determining a third of the plurality of queries cannot be executed in less time than the specified threshold value;
in response to determining the third query cannot be executed in less time than the specified threshold value, performing the steps of:
simultaneously executing first and second access plans for the third query; and
returning results of executing the first and second access plans as the partial results for the third query;
determining a fourth of the plurality of queries cannot be executed in less time than the specified threshold value;
in response to determining the fourth query cannot be executed in less time than the specified threshold value, performing the steps of:
modifying the fourth query to omit at least one portion of the fourth query;
executing the modified fourth query; and
returning results of executing the modified fourth query as the partial results for the query.
2. An article of manufacture comprising software stored on a non-transitory computer readable storage medium, the software comprising:
a query governor that performs the steps of:
determining a first of a plurality of queries to a database cannot be executed in less time than a specified threshold value;
in response to determining the first query cannot be executed in less time than the specified threshold value, performing the steps of:
executing an access plan for the first query for a period of time less than the specified threshold value;
halting execution of the access plan; and
returning the partial results for the first query;
determining a second of the plurality of queries cannot be executed in less time than the specified threshold value;

in response to determining the second query cannot be executed in less time than the specified threshold value, performing the steps of:
   executing a first access plan for the second query for a first period of time
   executing a second access plan for the second query for a second period of time, wherein the first period of time added to the second period of time is less than the specified threshold value; and
   returning query results from executing the first access plan and the second access plan as the partial results for the second query;

determining a third of the plurality of queries cannot be executed in less time than the specified threshold value;

in response to determining the third query cannot be executed in less time than the specified threshold value, performing the steps of:
   simultaneously executing first and second access plans for the third query; and
   returning results of executing the first and second access plans as the partial results for the third query;

determining a fourth of the plurality of queries cannot be executed in less time than the specified threshold value;

in response to determining the fourth query cannot be executed in less time than the specified threshold value, performing the steps of:
   modifying the fourth query to omit at least one portion of the fourth query;
   executing the modified fourth query; and
   returning results of executing the modified fourth query as the partial results for the query.

* * * * *